United States Patent
Sasaki et al.

(10) Patent No.: US 10,115,020 B2
(45) Date of Patent: Oct. 30, 2018

(54) IMAGE PROCESSING METHOD, NON-TRANSITORY COMPUTER-READABLE RECORDING MEDIUM, AND IMAGE PROCESSING DEVICE

(71) Applicant: FUJITSU LIMITED, Kawasaki-shi, Kanagawa (JP)

(72) Inventors: Kazuo Sasaki, Kobe (JP); Akihiko Yabuki, Isehara (JP)

(73) Assignee: FUJITSU LLIMITED, Kawasaki (JP)

( * ) Notice: Subject to any disclaimer, the term of this patent is extended or adjusted under 35 U.S.C. 154(b) by 130 days.

(21) Appl. No.: 15/289,428

(22) Filed: Oct. 10, 2016

(65) Prior Publication Data
US 2017/0132470 A1    May 11, 2017

(30) Foreign Application Priority Data
Nov. 6, 2015  (JP) ................................. 2015-218623

(51) Int. Cl.
  G06K 9/00   (2006.01)
  G06T 15/30  (2011.01)
  G06T 7/246  (2017.01)

(52) U.S. Cl.
  CPC ..... *G06K 9/00724* (2013.01); *G06K 9/00885* (2013.01); *G06T 7/246* (2017.01); *G06T 15/30* (2013.01); *G06K 2009/00738* (2013.01); *G06T 2207/10016* (2013.01); *G06T 2207/30224* (2013.01); *G06T 2207/30241* (2013.01)

(58) Field of Classification Search
  USPC ........................................................ 382/103
  See application file for complete search history.

(56) References Cited

U.S. PATENT DOCUMENTS

| | | | | |
|---|---|---|---|---|
| 2003/0053659 A1* | 3/2003 | Pavlidis | ............. | G06K 9/00335 |
| | | | | 382/103 |
| 2009/0265105 A1* | 10/2009 | Davis | ..................... | G01C 21/20 |
| | | | | 701/300 |
| 2011/0064268 A1* | 3/2011 | Cobb | ................. | G06K 9/00335 |
| | | | | 382/103 |
| 2013/0058532 A1* | 3/2013 | White | ................ | A63B 24/0003 |
| | | | | 382/103 |

(Continued)

FOREIGN PATENT DOCUMENTS

| JP | 03-139374 | 6/1991 |
|---|---|---|
| JP | 3012003 U | 6/1995 |

(Continued)

*Primary Examiner* — Ishrat I Sherali
(74) *Attorney, Agent, or Firm* — Fujitsu Patent Center

(57) ABSTRACT

An image processing device acquires multiple sets of continuous image data, captured by a capturing device, determines whether an object having a predetermined characteristic is present in a partial region of image data included in the sets of image data, using the processor repeatedly detects the object from image data that is captured prior to the image data where the object is present, when the object is determined to be present in the partial region, using the processor, calculates a movement trajectory of the object in accordance with positions of the object, detected from multiple sets of image data, and times of the sets of image data, using the processor and identifies a start position and a start time of the movement trajectory.

15 Claims, 13 Drawing Sheets

(56) References Cited

U.S. PATENT DOCUMENTS

| | | | | |
|---|---|---|---|---|
| 2014/0169758 A1* | 6/2014 | Sapoznikow | ...... | G06K 7/10009 386/241 |
| 2014/0206479 A1* | 7/2014 | Marty | ................ | A63B 24/0003 473/447 |
| 2014/0330411 A1 | 11/2014 | Lochmann | | |

FOREIGN PATENT DOCUMENTS

| | | |
|---|---|---|
| JP | 2003-174609 | 6/2003 |
| JP | 2014-531588 | 11/2014 |
| WO | 2013041124 | 3/2013 |

* cited by examiner

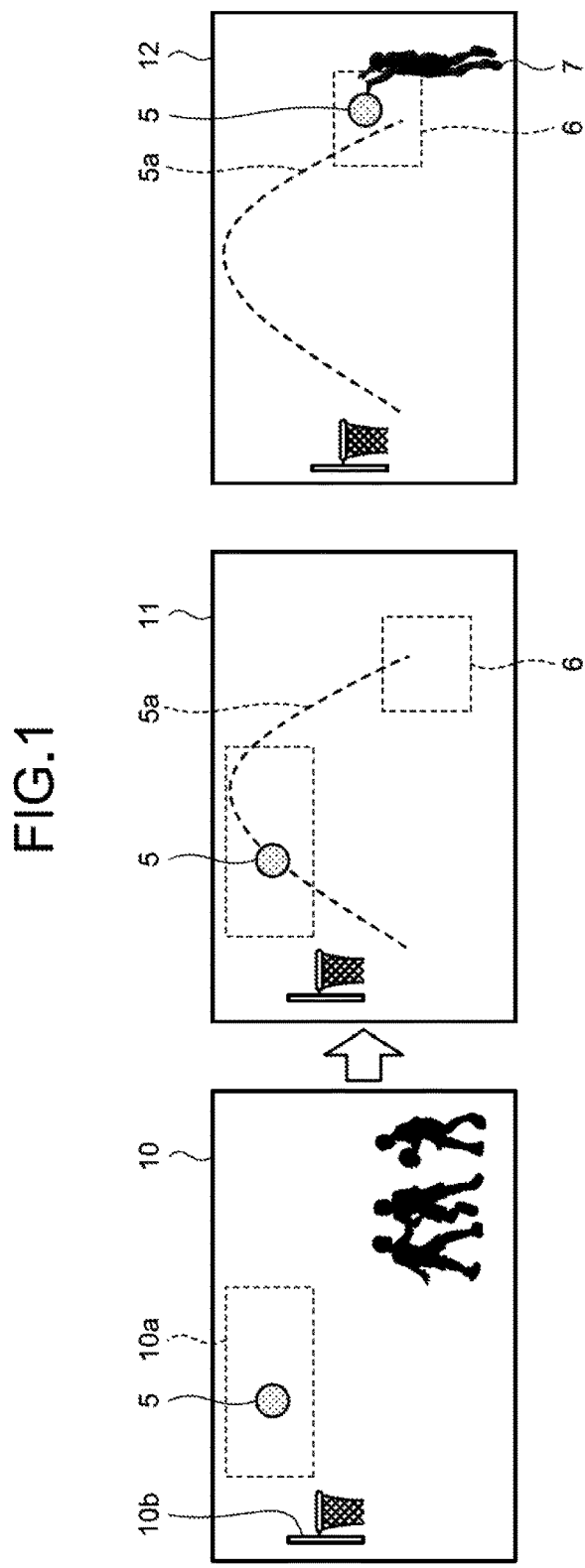

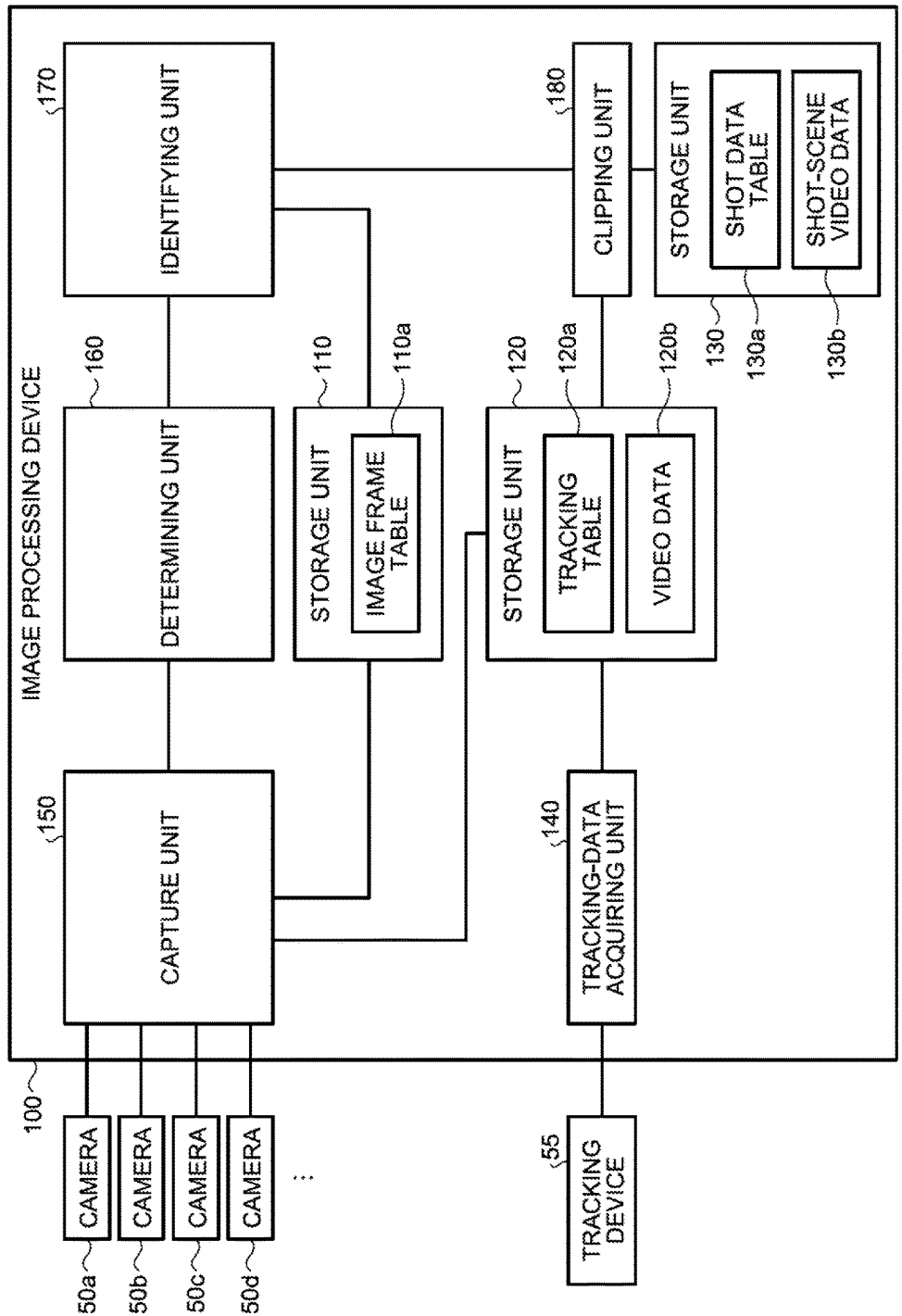

FIG.3

| TIME | IMAGE FRAME ACQUIRED FROM CAMERA 50a | IMAGE FRAME ACQUIRED FROM CAMERA 50b | IMAGE FRAME ACQUIRED FROM CAMERA 50c | IMAGE FRAME ACQUIRED FROM CAMERA 50d |
|---|---|---|---|---|
| 1:32:41:000 | IMAGE FRAME 1_0 | IMAGE FRAME 2_0 | IMAGE FRAME 3_0 | IMAGE FRAME 4_0 |
| 1:32:41:030 | IMAGE FRAME 1_1 | IMAGE FRAME 2_1 | IMAGE FRAME 3_1 | IMAGE FRAME 4_1 |
| 1:32:41:060 | IMAGE FRAME 1_2 | IMAGE FRAME 2_2 | IMAGE FRAME 3_2 | IMAGE FRAME 4_2 |
| ⋮ | ⋮ | ⋮ | ⋮ | ⋮ |

FIG.4

| TIME | POSITION OF PLAYER A | POSITION OF PLAYER B | POSITION OF PLAYER C |
|---|---|---|---|
| 1:32:41:002 | (x1,y1,z1) | (x21,y21,z21) | (x31,y31,z31) |
| 1:32:41:032 | (x2,y2,z2) | (x22,y22,z22) | (x32,y32,z32) |
| 1:32:41:062 | (x3,y3,z3) | (x23,y23,z23) | (x33,y33,z33) |
| ⋮ | ⋮ | ⋮ | ⋮ |

FIG.5

| START TIME | FINISH TIME | PLAYER IDENTIFICATION INFORMATION | BALL TRAJECTORY | VIDEO FILE NAME |
|---|---|---|---|---|
| 1:32:42:010 | 1:32:45:020 | PLAYER A | DATA ON BALL TRAJECTORY | Shoot001.ts |
| 1:32:45:06 | 1:32:48:040 | PLAYER B | DATA ON BALL TRAJECTORY | Shoot002.ts |
| ⋮ | ⋮ | ⋮ | ⋮ | ⋮ |

| TIME | THREE-DIMENSIONAL COORDINATES OF BALL |
|---|---|
| 1:32:42:010 | (x01,y01,z01) |
| 1:32:42:040 | (x02,y02,z02) |
| 1:32:43:010 | (x03,y03,z03) |

| TIME | ID1 | ID2 | ID3 |
|---|---|---|---|
| ⋮ | ⋮ | ⋮ | ⋮ |
| 1:32:41:002 | (x1,y1,z1) | (x21,y21,z21) | (x31,y31,z31) |
| 1:32:41:032 | (x2,y2,z2) | (x22,y22,z22) | (x32,y32,z32) |
| 1:32:41:062 | (x3,y3,z3) | (x23,y23,z23) | (x33,y33,z33) |

121a

IMAGE PROCESSING METHOD, NON-TRANSITORY COMPUTER-READABLE RECORDING MEDIUM, AND IMAGE PROCESSING DEVICE

CROSS-REFERENCE TO RELATED APPLICATION(S)

This application is based upon and claims the benefit of priority of the prior Japanese Patent Application No. 2015-218623, filed on Nov. 6, 2015, the entire contents of which are incorporated herein by reference.

FIELD

The embodiment(s) discussed herein is (are) related to an image processing method, or the like.

BACKGROUND

In recent years, sensor technologies and video processing technologies have been improved so that they are used in various sport fields. For example, with regard to team sports, such as soccer, basketball, or volleyball, there are conventional technologies for tracking the movement of the players or the ball during a game by using sensor technologies or video processing technologies. An explanation is given below of conventional technologies 1 and 2 as examples.

According to the conventional technology 1, the court where players are playing is captured by multiple cameras, and the ball is detected through image processing, such as matching. Furthermore, with the conventional technology 1, the position of the ball is calculated on the principle of stereo images. Furthermore, with the conventional technology 1, the players are detected through image processing as is the case with the ball, whereby the positions of the players may be also calculated on the principle of stereo images.

According to the conventional technology 2, a sensor is attached to the ball, and a communication is performed with the attached sensor so that the position of the ball is calculated. If a sensor is also attached to a player, the position of the player may be also calculated.

Some of the conventional technologies use the above-described conventional technologies 1, 2, or the like, to conduct tracking by repeatedly performing a process to calculate the position of the ball or the player and then present the tracking result of the ball or the player. FIG. 20 is a diagram that illustrates an example of the tracking result according to a conventional technology. In the example illustrated in FIG. 20, the two-dimensional positions of the players in the first team, who is present in a court 1, and the two-dimensional positions of the players in the second team are displayed in an identifiable manner.

Furthermore, aside from the tracking result illustrated in FIG. 20, the video data, captured by each camera, is stored in the database and, after the game is finished, the player searches for the video at the time of a shot and checks one's form during the shot.

[Patent Literature 1] Japanese National Publication of International Patent Application No. 2014-531588
[Patent Literature 2] Japanese Laid-open Patent Publication No. 2003-174609
[Patent Literature 3] Japanese Registered Utility Model No. 3012003
[Patent Literature 4] Japanese Laid-open Patent Publication No. 3-139374

However, the above-described conventional technologies have a problem in that it is difficult to search for the image desired by a user in an effective manner.

The above-described conventional technologies 1 and 2 are to detect the positions of the players or the ball, but not to detect the specific video data desired by users. Therefore, if a user is to check one's form at the time of a shot, it is typical that the user checks the video data stored in the database so as to identify the video data in the period of time during which the user makes the shot, which results in high workloads on users.

Furthermore, if the conventional technology 1 is used to identify the video data at the time of a shot through image processing, the processing loads become high and the accuracy is decreased, as there are various patterns, such as a case where there are multiple players on the same image, or a case where multiple players have different balls during practice. Moreover, according to the conventional technology 2, even if there are multiple players, the position of the ball may be detected; however, as the special ball, including the sensor, is used, it is difficult to use it during an official game.

SUMMARY

According to an aspect of an embodiment, a image processing method includes acquiring multiple sets of continuous image data, captured by a capturing device, using a processor; determining whether an object having a predetermined characteristic is present in a partial region of image data included in the sets of image data, using the processor; repeatedly detecting the object from image data that is captured prior to the image data where the object is present, when the object is determined to be present in the partial region, using the processor; calculating a movement trajectory of the object in accordance with positions of the object, detected from multiple sets of image data, and times of the sets of image data, using the processor; and identifying a start position and a start time of the movement trajectory, using the processor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram that illustrates a process of an image processing device according to the present embodiment;

FIG. 2 is a functional block diagram that illustrates the configuration of the image processing device according to the present embodiment;

FIG. 3 is a diagram that illustrates an example of the data structure of an image frame table;

FIG. 4 is a diagram that illustrates an example of the data structure of a tracking table;

FIG. 5 is a diagram that illustrates an example of the data structure of a shot data table;

FIG. 6 is a diagram that illustrates an example of the data structure of the ball trajectory;

DESCRIPTION OF EMBODIMENT(S)

Figure 7:
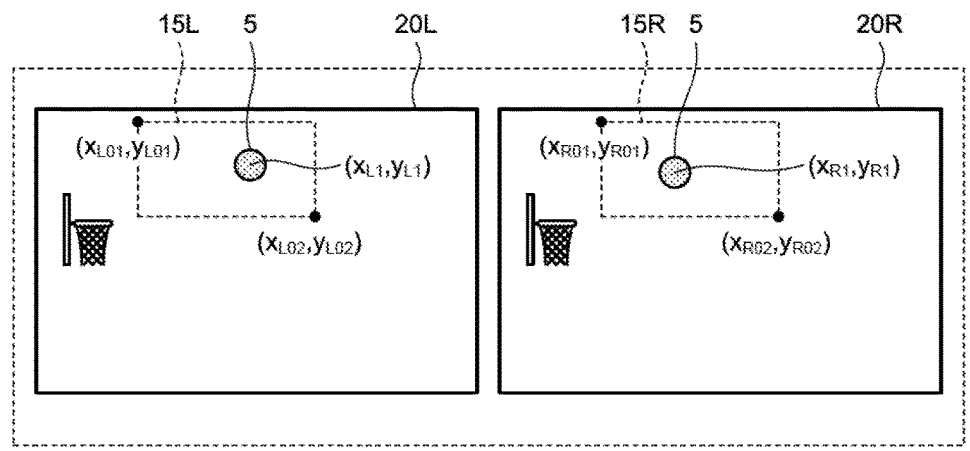
FIG. 7 is a diagram (1) that illustrates a process of a determining unit according to the present embodiment.

Preferred embodiments of the present invention will be explained with reference to accompanying drawings. Furthermore, the present invention is not limited to the embodiment.

An explanation is given of a process of an image processing device according to the present embodiment. FIG. 1 is a diagram that illustrates the process of the image processing device according to the present embodiment. The image processing device sets a partial region 10a, through which only the ball, shot by a player, passes, in an image frame 10. For example, the partial region 10a is set around a basket goal 10b.

The image processing device determines whether there is the ball within the partial region 10a. For example, the image processing device uses the template that defines the shape or size of the ball to determine whether there is the ball in the partial region 10a. In the example illustrated in FIG. 1, the image processing device detects a ball 5 from the partial region 10a. After detecting the ball 5 from the partial region 10a, the image processing device calculates the three-dimensional coordinates of the ball 5 on the principle of the stereo image.

After the image processing device detects the ball 5 from the partial region 10a, the image processing device acquires a first or second previous image frame 11 to the image frame 10 and detects the ball 5 from the image frame 11. The image processing device calculates the three-dimensional coordinates of the ball 5, detected from the image frame 11, on the principle of the stereo image.

The image processing device may use the position of the ball 5, detected from the image frame 10, as a clue to detect the ball 5 from the image frame 11. The image processing device estimates trajectory 5a of the ball 5 on the basis of the three-dimensional coordinates of the ball 5, detected from the image frames 10, 11. The image processing device uses the trajectory 5a to estimate a start position 6 of the trajectory 5a and the time when the ball 5 is present in the start position 6. In the following explanations, the time when the ball 5 is present in the start position 6 is referred to as the "start time" as appropriate.

The image processing device acquires an image frame 12, which corresponds to the start time, to detect the ball 5 from the start position 6. The image processing device calculates the three-dimensional coordinates of the ball 5, detected from the image frame 12, on the principle of the stereo image. The image processing device identifies a player 7 who is present at the three-dimensional coordinates of the ball 5.

As described above, if the image processing device detects the ball 5 from the partial region 10a, through which only the shot ball 5 passes, it traces back to an image frame based on the position of the ball 5, identifies the start position 6 that corresponds to the occurrence area of the shot, and identifies the image frame at the time of the shot. For example, in the example illustrated in FIG. 1, a plurality of image frames, which follows the image frame 12, is the video data that includes a sequence of actions after the player makes a shot. Therefore, with the image processing device, it is possible to search for the image that is desired by the user in an effective manner.

Next, an explanation is given of an example of the configuration of the image processing device according to the present embodiment. FIG. 2 is a functional block diagram that illustrates the configuration of the image processing device according to the present embodiment. As illustrated in FIG. 2, an image processing device 100 is connected to cameras 50a to 50d and a tracking device 55. The image processing device 100 includes a storage unit 110, a storage unit 120, and a storage unit 130. The image processing device 100 includes a tracking-data acquiring unit 140, a capture unit 150, a determining unit 160, an identifying unit 170, and a clipping unit 180.

The cameras 50a to 50d are the cameras that capture a video of the court where the players are playing. The cameras 50a to 50d are collectively referred to as a camera 50 as appropriate. At least the two or more cameras 50 among the cameras 50a to 50d are set such that the shooting range includes the partial region, through which only the shot ball passes. The camera 50 outputs the captured video data to the image processing device 100. The video data is the data where multiple image frames continue. According to the present embodiment, the cameras 50a to 50d are described as an example; however, different cameras may be further used to capture a video of the court and output the video data to the image processing device 100.

The tracking device 55 is a processing unit that repeatedly performs a process to detect the position of the player on the court, thereby generating tracking data where the position of the player is related to the time. The tracking device 55 outputs the tracking data to the image processing device 100. The tracking device 55 may generate the tracking data according to any conventional technology. For example, the tracking data may be generated by performing data communication with each sensor, the sensor attached to each player, or the tracking data may be generated through image processing based on the video data that is obtained from the camera 50.

The storage unit 110 includes an image frame table 110a. The storage unit 120 includes a tracking table 120a and video data 120b. The storage unit 130 includes a shot data table 130a and shot-scene video data 130b. For example, the storage units 110, 120, and 130 are equivalent to a semiconductor memory device, such as a random access memory (RAM), a read only memory (ROM), or a flash memory, or a storage device, such as a hard disk drive (HDD).

The image frame table 110a is the table that stores the video data (continuous image frames) captured by each of the cameras 50. FIG. 3 is a diagram that illustrates an example of the data structure of the image frame table. As illustrated in FIG. 3, the image frame table 110a relates the time and the image frame acquired from the camera 50.

The tracking table 120a is the table that stores the tracking data generated by the tracking device 55. FIG. 4 is a diagram that illustrates an example of the data structure of the tracking table. As illustrated in FIG. 4, the tracking table 120a relates the time and the three-dimensional coordinates of a player.

The video data 120b is the video data captured by the camera 50. For example, the video data 120b includes the video data of the camera 50 whose shooting range includes the entire court among the cameras 50 or includes the video data of the camera 50 whose shooting range includes a partial region in the entire court.

The shot data table 130a is the table that stores the information about the video in which a player shoots the ball. FIG. 5 is a diagram that illustrates an example of the data structure of the shot data table. As illustrated in FIG. 5, the shot data table 130a relates the start time, the finish time, the player identification information, the ball trajectory, and the video file name.

The shot-scene video data 130b indicates the video data on the shot scene of a player. For example, the shot-scene video data 130b includes the information in which the video file name is related to the video data. The shot-scene video data 130b is clipped from the video data 120b by the clipping unit 180 that is described later.

The start time is the time when a player shoots the ball, and it is equivalent to, for example, the start time that is explained with FIG. 1. The finish time is equivalent to, for example, the time that elapsed with a predetermined time after the start time. The player identification information is the information for uniquely identifying a player. The ball trajectory is the information that relates the three-dimensional coordinates of the ball and the time from the start time to the finish time. The video file name indicates the file name of the video data from the start time to the finish time.

FIG. 6 is a diagram that illustrates an example of the data structure of the ball trajectory. As illustrated in FIG. 6, the ball trajectory relates the time and the three-dimensional coordinates of the ball.

Return to the explanation of FIG. 2. The tracking-data acquiring unit 140 is a processing unit that acquires the tracking data from the tracking device 55. For example, the tracking data includes the information that relates the three-dimensional coordinates of the player and the time. The tracking-data acquiring unit 140 stores the tracking data in the tracking table 120a.

The capture unit 150 is a processing unit that acquires the video data from the camera 50. The video data includes multiple continuous image frames. Furthermore, the time information is attached to each image frame. The capture unit 150 stores the video data in the image frame table 110a. Furthermore, the capture unit 150 outputs the video data to the determining unit 160. Moreover, the capture unit 150 stores the video data 120b in the storage unit 120.

The determining unit 160 is a processing unit that acquires video data from the capture unit 150 and that determines whether the ball is present in a partial region of the image frame included in the video data. If the ball is detected, the determining unit 160 relates the three-dimensional coordinates of the ball and the time of the image frame, from which the ball is detected, and outputs them to the identifying unit 170.

FIG. 7 is a diagram that illustrates a process of the determining unit according to the present embodiment. An image frame 20L, illustrated in FIG. 7, is the image frame captured by the camera 50a and an image frame 20R is the image frame captured by the camera 50b. For example, the camera 50b is installed on the right side of the camera 50a.

The determining unit 160 sets a partial region 15L in the image frame 20L. The coordinates of the upper left of the partial region 15L are $(x_{L01}, Y_{L01})$, and the coordinates of the lower right of the partial region 15L are $(x_{L02}, y_{L02})$. For example, the determining unit 160 conducts template matching that defines the shape and the size of the ball, thereby detecting the ball 5 from the partial region 15L. The coordinates of the ball 5, detected from the partial region 15L, are $(x_{L1}, y_{L1})$.

The determining unit 160 sets a partial region 15R in the image frame 20R. The coordinates of the upper left of the partial region 15R are $(x_{R01}, y_{R01})$, and the coordinates of the lower right of the partial region 15R are $(x_{R02}, y_{R02})$. For example, the determining unit 160 conducts template matching that defines the shape and the size of the ball, thereby detecting the ball 5 from the partial region 15R. The coordinates of the ball 5, detected from the partial region 15R, are $(x_{R1}, y_{R1})$.

Figure 8:
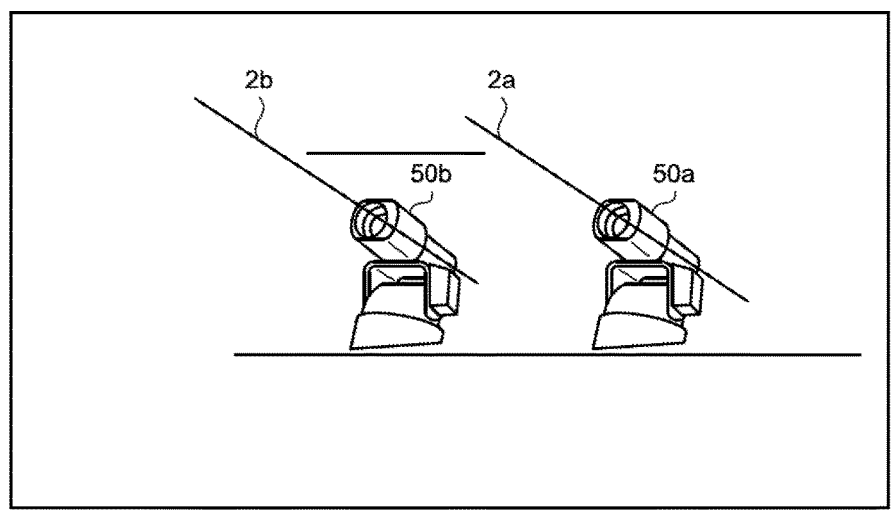
FIG. 8 is a diagram that illustrates the installation positions of the cameras.

The determining unit 160 calculates the three-dimensional coordinates of the ball 5 on the principle of the stereo image. Here, for simplification, an explanation is given of an example of the process to convert the two-dimensional coordinates into the three-dimensional coordinates by using, for example, a parallel stereo image with the optical axes parallel to each other. FIG. 8 is a diagram that illustrates the installation positions of the cameras. As illustrated in FIG. 8, an optical axis 2a of the camera 50a is parallel to an optical axis 2b of the camera 50b.

Figure 9:
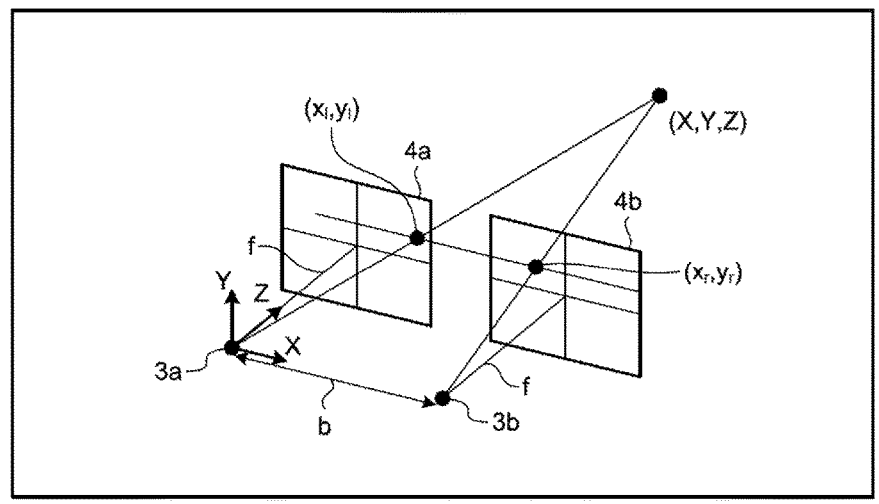
FIG. 9 is a diagram that illustrates the coordinate system using parallel stereo.

FIG. 9 is a diagram that illustrates the coordinate system using parallel stereo. For example, the projection center of the left camera 50a is 3a, and the projection center of the right camera 50b is 3b. The interval between the projection centers 3a and 3b is b. Furthermore, image planes 4a and 4b of the cameras 50a and 50b are present on the same flat plane in the three-dimensional space away from the projection centers 3a and 3b by f.

If the coordinates of the object of interest on the image plane 4a are $(x_l, y_l)$ and the coordinates of the object of interest on the image plane 4b are $(x_r, y_r)$, the three-dimensional coordinates (X, Y, Z) of the object of interest are represented by Equations (1), (2), and (3).

$$X = \frac{x_l b}{x_l - x_r} \quad (1)$$

$$Y = \frac{y_l b}{x_l - x_r} \quad (2)$$

$$Z = \frac{fb}{x_l - x_r} \quad (3)$$

The determining unit 160 converts the two-dimensional coordinates of the ball 5 into three-dimensional coordinates in accordance with Equation (1) to Equation (3). For example, as illustrated in FIG. 7, if the coordinates of the ball 5 in the left image frame 20L are $(x_{L1}, y_{L1})$ and the coordinates of the ball 5 in the right image frame 20R are ($x_{R1}$, $y_{R1}$), the three-dimensional coordinates ($X_{S1}$, $Y_{S1}$, $Z_{S1}$) of the ball 5 are calculated by using Equations (1a), (2a), and (3a). Furthermore, the time when the image frame 20L and the image frame 20R are captured is $T_{S1}$.

$$X_{S1}=x_{L1}b/(x_{L1}-x_{R1}) \quad (1a)$$

$$Y_{S1}=y_{L1}b/(x_{L1}-x_{R1}) \quad (2a)$$

$$Z_{S1}=fb/(x_{L1}-x_{R1}) \quad (3a)$$

During the above-described process, the determining unit 160 calculates the three-dimensional coordinates ($X_{S1}$, $Y_{S1}$, $Z_{S1}$) of the ball 5. The determining unit 160 outputs the information on the three-dimensional coordinates ($X_{S1}$, $Y_{S1}$, $Z_{S1}$) of the ball 5, the time $T_{S1}$, and the two-dimensional coordinates ($x_{L1}$, $y_{L1}$), ($x_{R1}$, $y_{R1}$) to the identifying unit 170.

Return to the explanation of FIG. 2. The identifying unit 170 repeatedly performs a process to detect the ball from the image frame that is previous to the image frame, in which it is determined that the ball is present in the partial region, thereby calculating the movement trajectory of the ball on the basis of the position of each ball. Furthermore, the identifying unit 170 identifies the start position of the movement trajectory. An explanation is given below of a process to detect the ball from the previous image frame by the identifying unit 170 and a process to identify the start position by calculating the movement trajectory of the ball.

Figure 10:
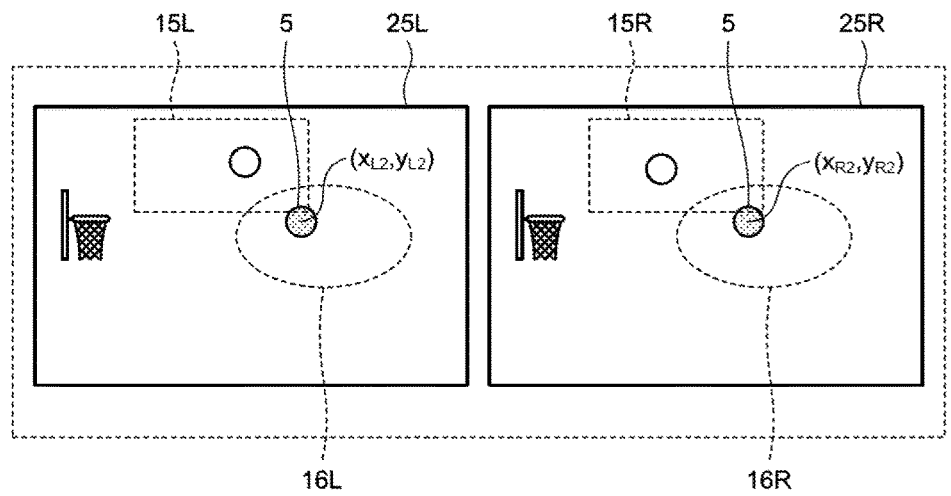
FIG. 10 is a diagram (1) that illustrates a process of the identifying unit according to the present embodiment.

An explanation is given of the process to detect the ball from the previous image frame by the identifying unit 170. FIG. 10 is a diagram (1) that illustrates the process of the identifying unit according to the present embodiment. The identifying unit 170 acquires, from the image frame table 110a, an image frame 25L captured by the camera 50a and an image frame 25R captured by the camera 50b at $T_{S2}$ that is a predetermined time before the time $T_{S1}$.

An explanation is given of the process of the identifying unit 170 with regard to the image frame 25L. The identifying unit 170 sets a detection area 16L that is located away from the two-dimensional coordinates ($x_{L1}$, $y_{L1}$) of the ball 5, detected from the previous image frame 20L, by a predetermined distance. The identifying unit 170 conducts template matching that defines the shape and the size of the ball, thereby detecting the ball 5 from the detection area 16L. The coordinates of the ball 5, detected from the detection area 16L, are ($x_{L2}$, $y_{L2}$).

An explanation is given of the process of the identifying unit 170 with regard to the image frame 25R. The identifying unit 170 sets a detection area 16R that is located away from the two-dimensional coordinates ($x_{R1}$, $y_{R1}$) of the ball 5, detected from the previous image frame 20R, by a predetermined distance. The identifying unit 170 conducts template matching that defines the shape and the size of the ball, thereby detecting the ball 5 from the detection area 16R. The coordinates of the ball 5, detected from the detection area 16R, are ($x_{R2}$, $y_{R2}$).

In the same manner as the determining unit 160, the identifying unit 170 calculates the three-dimensional coordinates of the ball 5 at the time $T_{S2}$. As illustrated in FIG. 10, the coordinates of the ball 5 in the left image frame 25L are ($x_{L2}$, $y_{L2}$), and the coordinates of the ball 5 in the right image frame 25R are ($x_{R2}$, $y_{R2}$). Hence, the three-dimensional coordinates ($X_{S2}$, $Y_{S2}$, $Z_{S2}$) of the ball 5 at the time $T_{S2}$ are calculated by using Equations (1b), (2b), and (3b).

$$x_{S2}=x_{L2}b/(x_{L2}-x_{R2}) \quad (1b)$$

$$Y_{S2}=y_{L2}b/(x_{L2}-x_{R2}) \quad (2b)$$

$$Z_{S2}=fb/(x_{L2}-x_{R2}) \quad (3b)$$

Figure 11:
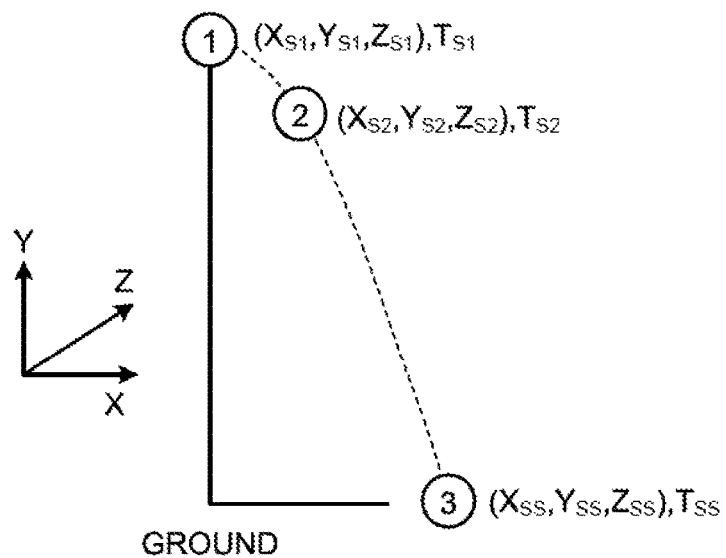
FIG. 11 is a diagram (2) that illustrates a process of the identifying unit according to the present embodiment.

Next, an explanation is given of the process by the identifying unit 170 to identify the start position by calculating the movement trajectory of the ball. FIG. 11 is a diagram (2) that illustrates the process of the identifying unit according to the present embodiment. As illustrated in FIG. 11, the three-dimensional coordinates of the ball 5 at the time $T_{S1}$ are ($X_{S1}$, $Y_{S1}$, $Z_{S1}$), and the three-dimensional coordinates of the ball 5 at the time $T_{S2}$ are ($X_{S2}$, $Y_{S2}$, $Z_{S2}$). The identifying unit 170 uses the above-described information to calculate the start position ($X_{SS}$, $Y_{SS}$, $Z_{SS}$) and a start time $T_{SS}$ of the shot.

The identifying unit 170 calculates $X_{SS}$ in accordance with Equation (4). The identifying unit 170 sets the value of $Y_{SS}$ as a fixed value. $Y_{SS}$ is the Y-coordinate that corresponds to the ground. The identifying unit 170 calculates $Z_{SS}$ in accordance with Equation (5). The identifying unit 170 calculates the start time $T_{SS}$ by using Equation (6).

$$X_{SS}=X_{S1}-V_{XS1} \times T_D \quad (4)$$

$$Z_{SS}=Z_{S1}-V_{ZS1} \times T_D \quad (5)$$

$$T_{SS}=T_{S1}-T_D \quad (6)$$

$V_{XS1}$, $V_{YS1}$, $V_{ZS1}$, included in the above-described Equations (4), (5) and Equation (10), which is described later, represent the speeds in the directions of the X axis, the Y axis, and the Z axis at the time $T_{S1}$. $V_{XS1}$ is represented by Equation (7). $V_{YS1}$ is represented by Equation (8). $V_{ZS1}$ is represented by Equation (9). Furthermore, $T_D$ is represented by Equation (10). The identifying unit 170 calculates $V_{XS1}$, $V_{YS1}$, $V_{ZS1}$, and $T_D$ in accordance with Equations (7) to (10).

$$V_{XS1}=(X_{S1}-X_{S2})/(T_{S1}-T_{S2}) \quad (7)$$

$$V_{YS1}=(Y_{S1}-Y_{S2})/(T_{S1}-T_{S2}) \quad (8)$$

$$V_{ZS1}=(Z_{S1}-Z_{S2})/(T_{S1}-T_{S2}) \quad (9)$$

$$T_D = \frac{-V_{YS1} + \sqrt{V_{YS1}^2 - 2Y_{S1}g}}{g} \quad (10)$$

The identifying unit 170 performs the above-described process to calculate the start position ($X_{SS}$, $Y_{SS}$, $Z_{SS}$) and the start time $T_{SS}$. The identifying unit 170 outputs the information on the start position ($X_{SS}$, $Y_{SS}$, $Z_{SS}$) and the start time $T_{SS}$ to the clipping unit 180. Furthermore, the identifying unit 170 outputs the information on the three-dimensional coordinates of the ball at the time $T_{S1}$ and the three-dimensional coordinates of the ball at the time $T_{S2}$ to the clipping unit 180.

Here, the identifying unit 170 may perform a process to correct the calculated start position. The identifying unit 170 acquires the image frame, corresponding to the start time $T_{SS}$, from the image frame table 110a, conducts template matching by using the pre-correction start position as an origin, and detects the ball from the image frame. Then, if the ball is detected, the identifying unit 170 may calculate the three-dimensional coordinates of the ball on the principle of stereo images and correct the start position by using the calculated three-dimensional coordinates.

The clipping unit 180 is a processing unit that generates the information, which is stored in the shot data table 130a, on the basis of the start position ($X_{SS}$, $Y_{SS}$, $Z_{SS}$), the start time $T_{SS}$, and the tracking table 120a. Furthermore, the clipping unit 180 clips the video data from the start time until after a predetermined time from the video data 120b, attaches the video file name, and stores it in the shot-scene video data 130b.

Here, an explanation is given of an example of a process by the clipping unit 180 to register the start time, the finish time, the player identification information, the ball trajectory, and the video file name in the shot data table 130a that is illustrated in FIG. 5.

The clipping unit 180 registers the start time $T_{SS}$, acquired from the identifying unit 170, as the start time in the shot data table 130a. The clipping unit 180 identifies the time, which elapsed with a predetermined time after the start time, as the finish time and registers the identified finish time in the shot data table 130a.

Next, an explanation is given of an example of a process by the clipping unit 180 to identify the player identification information on the player who makes a shot. The clipping unit 180 compares the start time $T_{SS}$ and the tracking table 120a to acquire the three-dimensional coordinates of each player at the start time $T_{SS}$. The clipping unit 180 compares the three-dimensional coordinates of each player and the start position ($X_{SS}$, $Y_{SS}$, $Z_{SS}$) to identify the player identification information on the player who is located closest to the start position. The clipping unit 180 registers the identified player identification information in the shot data table 130a.

Figure 12:
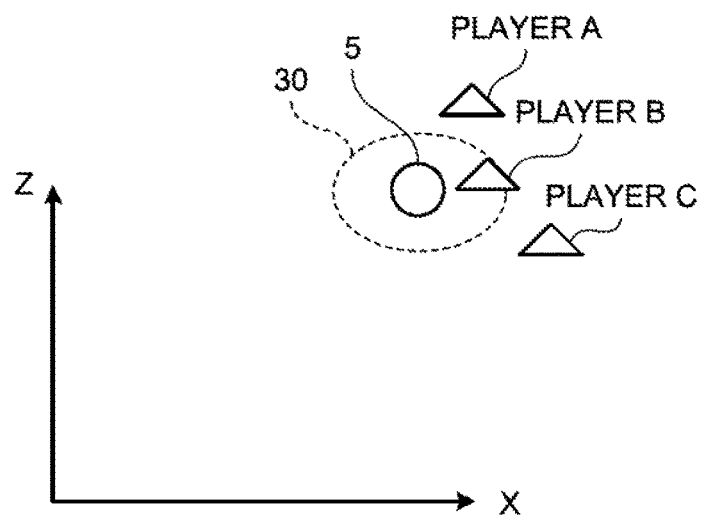
FIG. 12 is a diagram that illustrates a process of a clipping unit according to the present embodiment.

FIG. 12 is a diagram that illustrates a process of the clipping unit according to the present embodiment. In FIG. 12, the horizontal axis is the axis in the X direction, and the vertical axis is the axis in the Z direction. The three-dimensional coordinates of the ball 5 are ($X_{SS}$, $Y_{SS}$, $Z_{SS}$). For example, the clipping unit 180 sets, as a detection area 30, the area within a radius of 1 m from the three-dimensional coordinates of the ball 5 as a reference. The clipping unit 180 identifies the player identification information on the player who is included in the detection area 30. In the example illustrated in FIG. 12, the player identification information is "player B". Furthermore, if multiple players are present in the detection area 30, the player identification information on the player, who is located closest to the ball 5, is identified.

The clipping unit 180 registers the information on the three-dimensional coordinates of the ball at each time as data on the ball trajectory in the shot data table 130a. For example, the clipping unit 180 sets the three-dimensional coordinates of the ball at the times $T_{S1}$, $T_{S2}$, and $T_{SS}$ as the data on the ball trajectory.

The clipping unit 180 clips the video data from the start time to the finish time, registered in the shot data table 130a, from the video data 120b, sets a video file name to the clipped video data, and stores it in the shot-scene video data 130b. Furthermore, the clipping unit 180 registers the video file name, which is set to the clipped video data, in the shot data table 130a.

Furthermore, if there are no players in the detection area 30, the clipping unit 180 may request the identifying unit 170 to recalculate the start time and the start position. If the identifying unit 170 receives a recalculation request, it acquires the image frame at a time $T_{SS}'$, which is earlier than the start time $T_{SS}$, from the image frame table 110a and detects the three-dimensional coordinates of the ball from the acquired image frame. The identifying unit 170 outputs the information on the time $T_{SS}'$ and the newly detected start position of the ball to the clipping unit 180. The clipping unit 180 performs a process to detect a player again on the basis of the information on the time $T_{SS}'$ and the newly detected start position of the ball.

Figure 13:
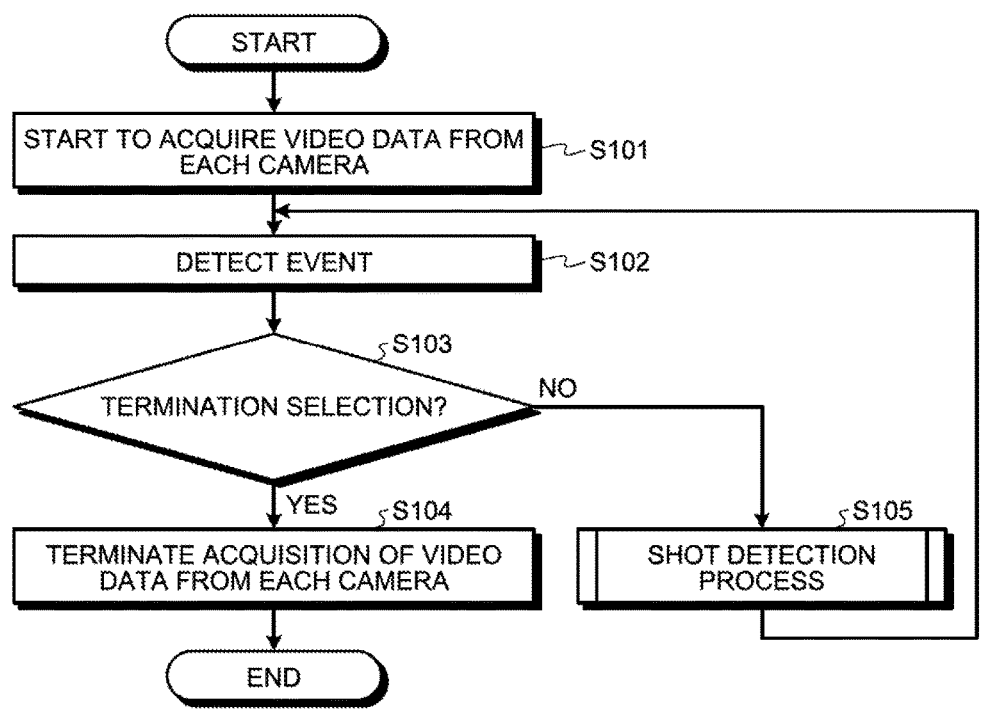
FIG. 13 is a flowchart that illustrates the steps of a process of the image processing device according to the present embodiment.

Next, an explanation is given of an example of the steps of the process of the image processing device 100 according to the present embodiment. FIG. 13 is a flowchart that illustrates the steps of the process of the image processing device according to the present embodiment. As illustrated in FIG. 13, the image processing device 100 starts to acquire the video data from each of the cameras 50 (Step S101). The image processing device 100 detects an event (Step S102).

If the detected event is a termination selection (Step S103, Yes), the image processing device 100 terminates acquisition of the video data from each of the cameras 50 (Step S104). Conversely, if the detected event is not a termination selection (Step S103, No), the image processing device 100 performs a shot detection process (Step S105) and proceeds to Step S102.

Figure 14:
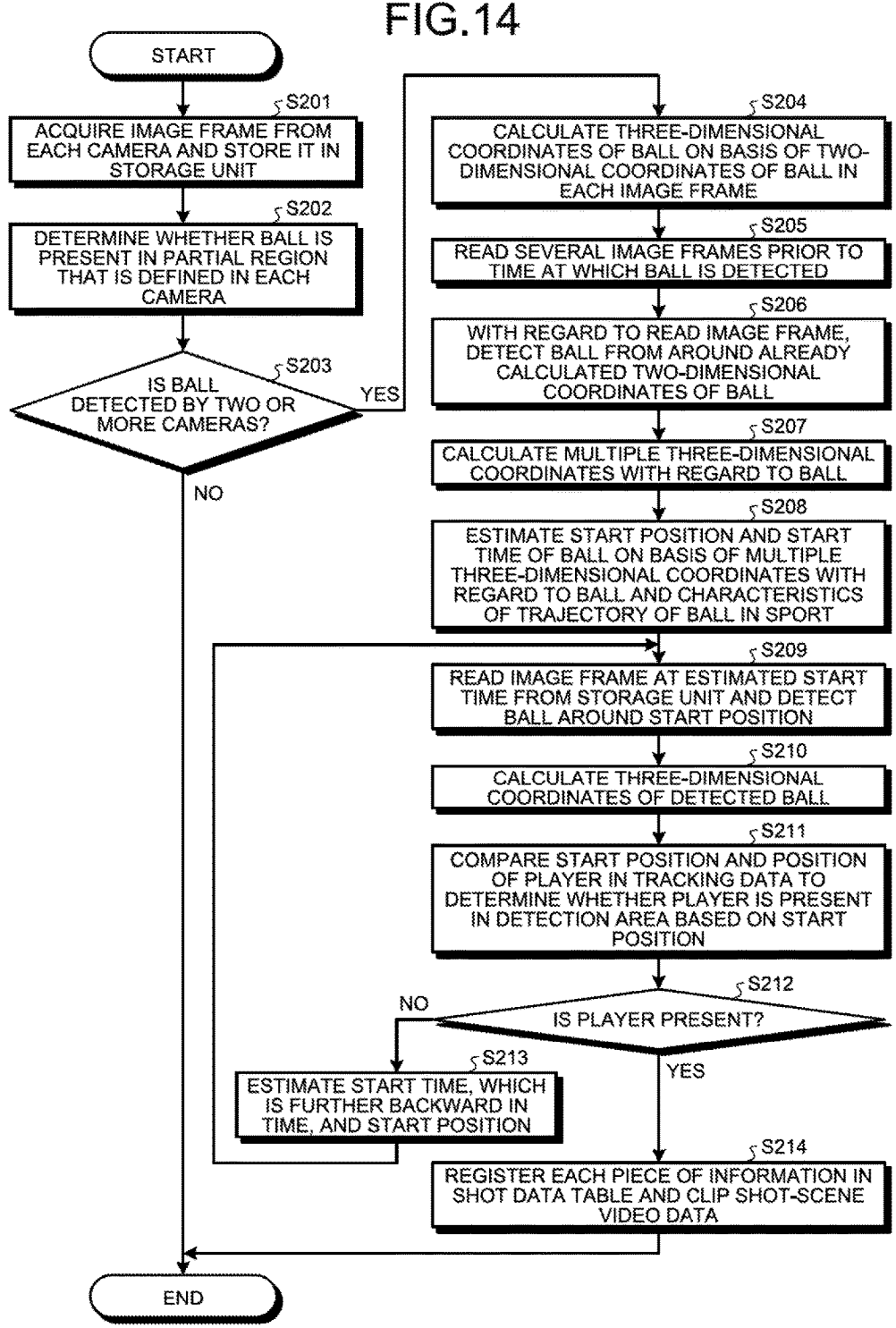
FIG. 14 is a flowchart that illustrates the steps of a shot detection process.

Next, an explanation is given of an example of the steps of the shot detection process, which is illustrated at Step S105 of FIG. 13. FIG. 14 is a flowchart that illustrates the steps of the shot detection process. As illustrated in FIG. 14, the capture unit 150 of the image processing device 100 acquires the image frame from each of the cameras 50 and stores it in the storage unit 110 (Step S201).

The determining unit 160 of the image processing device 100 determines whether the ball is present in the partial region that is defined in each of the cameras 50 (Step S202). If the ball is not detected by the two or more cameras 50 (Step S203, No), the determining unit 160 terminates the shot detection process. If the ball is detected by the two or more cameras 50 (Step S203, Yes), the determining unit 160 proceeds to Step S204.

The determining unit 160 calculates the three-dimensional coordinates of the ball on the basis of the two-dimensional coordinates of the ball in each image frame (Step S204). The identifying unit 170 of the image processing device 100 reads, from the image frame table 110a, several image frames prior to the time $T_{S1}$, at which the ball is detected (Step S205).

With regard to the read image frame, the identifying unit 170 detects the ball from around the already calculated two-dimensional coordinates of the ball (Step S206) and calculates multiple three-dimensional coordinates with regard to the ball (Step S207). The identifying unit 170 estimates the start position and the start time of the ball on the basis of the multiple three-dimensional coordinates and the characteristics of the trajectory of the ball in the sport (Step S208). For example, at Step S208, if the sport is a basketball and the ball moves in a parabolic line, the identifying unit 170 estimates the start position and the start time by using Equation (4) to Equation (10). For other sports, the identifying unit 170 changes the trajectory of the ball in accordance with the type of sport and estimates the start position and the start time of the ball. For example, if the ball changes linearly in a sport, such as volleyball, the trajectory of the ball is set in a linear fashion.

The identifying unit 170 reads the image frame at the estimated start time from the storage unit 120 and detects the ball around the start position (Step S209). The identifying unit 170 calculates the three-dimensional coordinates of the detected ball (Step S210). The clipping unit 180 of the image processing device 100 compares the start position and the position of the player in the tracking data to determine whether a player is present in the detection area based on the start position (Step S211).

If the clipping unit 180 determines that no players are present in the detection area (Step S212, No), the identifying unit 170 estimates the start time, which is further backward in time, and the start position (Step S213) and proceeds to Step S209.

Conversely, if the clipping unit 180 determines that a player is present in the detection area (Step S212, Yes), it registers each piece of information in the shot data table 130a and clips the shot-scene video data 130b (Step S214).

Next, an explanation is given of an advantage of the image processing device 100 according to the present embodiment. If the image processing device 100 detects the ball from the partial region, through which only the shot ball passes, it traces back to the image frame based on the position of the detected ball and identifies the start position and the start time of the shot, whereby users are capable of searching for the desired image frame in an effective manner.

For example, the image processing device 100 starts to estimate the start position and the start time of the shot by using, as a trigger, detection of the ball from the partial region, through which the ball passes at the time of shooting, whereby the processing loads may be reduced. Furthermore, it is rare that multiple balls are simultaneously detected in the partial region; therefore, the start position and the start time of the shot may be identified with high accuracy although some players practice shooting at the same time the other players do other practices by using the ball.

The image processing device 100 estimates the movement trajectory of the ball on the basis of the three-dimensional coordinates of the ball, detected from some image data, and estimates the start position and the start time of the shot. Therefore, the process to detect the ball in the trajectory of the ball in progress may be omitted, and the processing loads may be reduced.

The image processing device 100 compares the start position of the shot with the positions of the players included in the image data, which is captured at the same time as the start time, thereby identifying the player who has made a shot. Therefore, it is possible to accurately identify the player who makes a shot.

Next, an explanation is given of a different process of the image processing device 100 according to the present embodiment.

The determining unit 160 of the image processing device 100 sets a partial region in the image frame captured by the camera 50 and determines whether the ball is present in the partial region; however, this is not a limitation. For example, a depth camera, a distance sensor, or the like, may be set near the goal so that the determining unit 160 determines whether the ball is present near the goal on the basis of the information obtained from the depth camera or the distance sensor.

The determining unit 160 and the identifying unit 170 of the image processing device 100 detect the ball from the image frame through, for example, template matching; however, the detection condition may be adjusted in a case where the ball is detected from the partial region and in a case where the ball is detected from a different region. For example, as there is a low possibility that an object other than the ball is present in the partial region, the condition for ball detection is tightened. Conversely, as players other than the ball are often included in the region near the ground, the condition for ball detection is set to be soft.

For example, the determining unit 160 conducts template matching with the object that is present in the partial region of the image frame and, if the matching percentage is equal to or more than M %, determines that the object is the ball. Conversely, the identifying unit 170 conducts template matching with the object that is present in the image frame near the ground and, if the matching percentage is equal to or more than N %, determines that the object is the ball. Here, the magnitude relationship between M and N is "M>N".

The identifying unit 170 of the image processing device 100 performs a process to detect the ball from the image frame by using, as a trigger, detection of the ball from the partial region by the determining unit 160; however, this is not a limitation. For example, the identifying unit 170 may detect the ball in real time from the image frame acquired from the camera 50 regardless of whether the determining unit 160 detects the ball or not. In this way, as the identifying unit 170 always detects the ball from the image frame, the speed of processing may be increased, compared to the case where detection of the ball is started after the determining unit 160 detects the ball.

If the clipping unit 180 of the image processing device 100 acquires the information on the start position and the start time of the shot from the identifying unit 170, it clips the video data and registers it in the storage unit 130 regardless of whether the shot is successful; however, this is not a limitation. For example, if the shot is successful, the clipping unit 180 may clip the video data from the start time of the shot, which is a successful shot, until the shot becomes successful and then register it in the storage unit 130. In the same manner, only if the shot is successful, the clipping unit 180 may register various types of information in the shot data table 130a. For example, the clipping unit 180 uses a sensor that senses the area where the ball always passes if the shot is successful, thereby determining success/failure of the shot. By performing this operation, the amount of data stored in the storage unit 130 may be reduced.

Figures 15, 16:
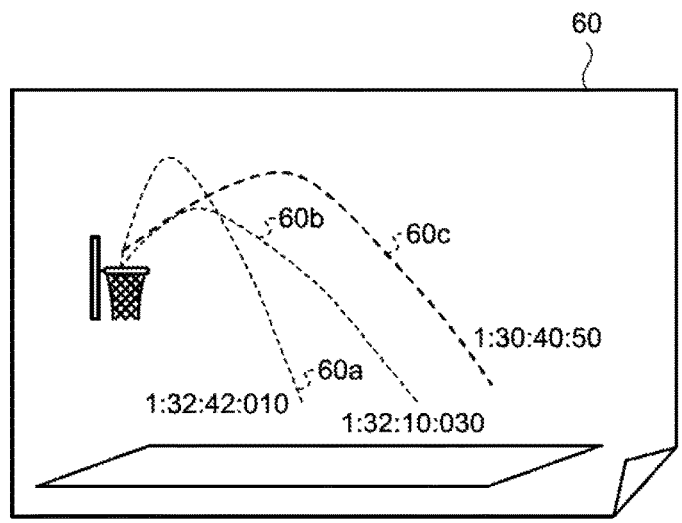
FIG. 15 is a diagram that illustrates an example of the display screen for the ball trajectory.
FIG. 16 is a diagram that illustrates an example of the different data structure of the tracking table.

If the image processing device 100 receives, from an undepicted input device, a request to display the ball trajectory with the player identification information specified, it may refer to the shot data table 130a, generate the display screen for the ball trajectory that corresponds to the player identification information, and display it. FIG. 15 is a diagram that illustrates an example of the display screen for the ball trajectory. In the example illustrated in FIG. 15, a display screen 60 presents trajectories 60a, 60b, and 60c of the balls that are shot by players. The image processing device 100 may display the information on the start time or the start position in relation to the ball trajectory. Furthermore, the image processing device 100 may output the information on the display screen 60 to a printer, or the like, so that the information on the display screen 60 is printed.

Furthermore, an explanation is given of an example of the data structure of the tracking table 120a, explained in the present embodiment, by using FIG. 4; however, the data structure of the tracking table 120a is not limited to that in FIG. 4. For example, it is possible that, at the initial stage, tracking is conducted while a predetermined ID is allocated, which is not attached with the name of a player, and, when the name of a player is related to the ID, the ID is replaced with the player identification information. FIG. 16 is a diagram that illustrates an example of the different data structure of the tracking table. In a tracking table 121a, illustrated in FIG. 16, the time is related to the ID.

Figure 17:
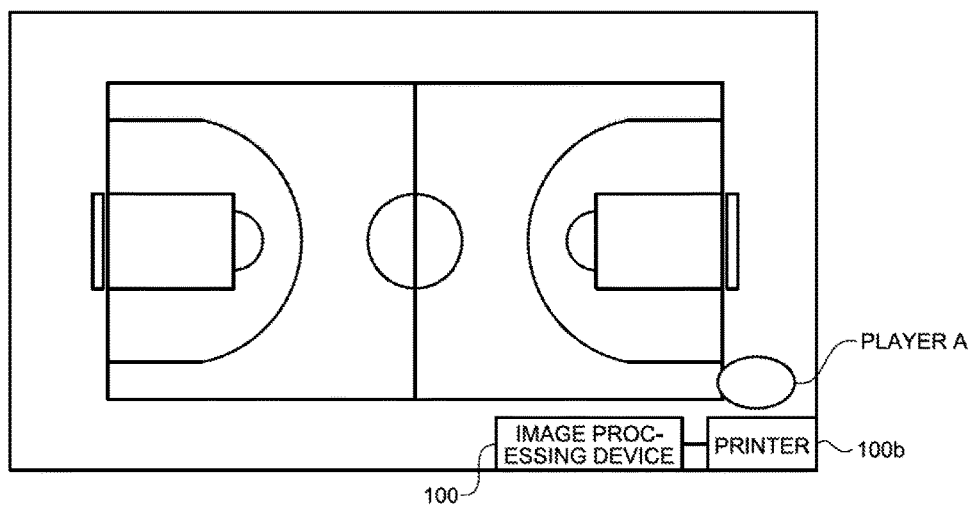
FIG. 17 is a diagram that illustrates a different process of the image processing device.

Here, an explanation is given of a different process of the image processing device 100. FIG. 17 is a diagram that illustrates a different process of the image processing device. As illustrated in FIG. 17, the image processing device 100 is connected to a printer 100b. For example, a player A inputs the player identification information to the image processing device 100 and performs an operation to print out the information about the shot trajectory from the printer 100b. At this point, as the relationship between the position of the player A and the player identification information on the player A is determined, the image processing device 100 performs a process to convert the ID into the player identification information on the player A. For example, if the player A is located at the position (x3, y3, z3) at the time "1:32:41:62", "ID1" in FIG. 16 may be related to the player identification information on the player A.

Figure 18:
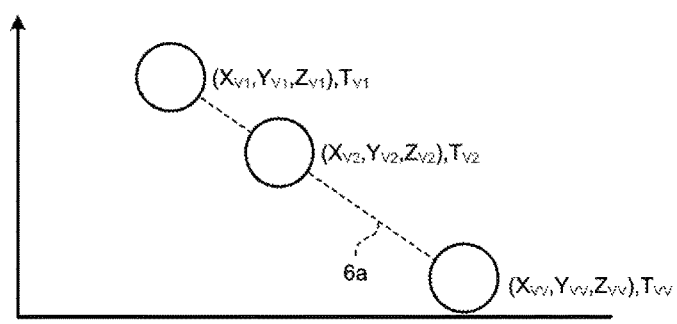
FIG. 18 is a diagram that illustrates a different process of the identifying unit.

For explanations of the identifying unit 170 of the image processing device 100, an explanation is given based on the assumption that, for example, the type of sport is basketball and the characteristic of the trajectory of the ball is the trajectory 5a illustrated in FIG. 1. For example, the identifying unit 170 determines the start position and the start time of the ball by using Equation (4) to Equation (10), or the like. Here, if the type of sport is other than the basketball, the equation to be used may be changed in accordance with the characteristics of the trajectory of the ball so that the trajectory of the ball is estimated. For example, if the type of sport is volleyball, or the like, and the trajectory of the ball is changed in a straight line, a trajectory 6a, illustrated in FIG. 18, may be estimated so that the landing position and the landing time are estimated. FIG. 18 is a diagram that illustrates a different process of the identifying unit.

As illustrated in FIG. 18, the identifying unit 170 detects the ball 5 from the image frames at different times $T_{V1}$ and $T_{V2}$, and it determines that the positions of the balls are $(X_{V1}, Y_{V1}, Z_{V1})$ and $(X_{V2}, Y_{V2}, Z_{V2})$, respectively. The identifying unit 170 determines that the straight line that passes through $(X_{V1}, Y_{V1}, Z_{V1})$ and $(X_{V2}, Y_{V2}, Z_{V2})$ is the trajectory 6a of the ball. The identifying unit 170 determines that the intersection position $(X_{VV}, Y_{VV}, Z_{VV})$ between the trajectory 6a and the ground is the landing position. Furthermore, a landing time $T_{VV}$ may be calculated on the basis of the speed of the ball in the direction of the Y axis at the time $T_{V1}$ and the height of the ball in the direction of the Y axis at the time $T_{V1}$.

Figure 19:
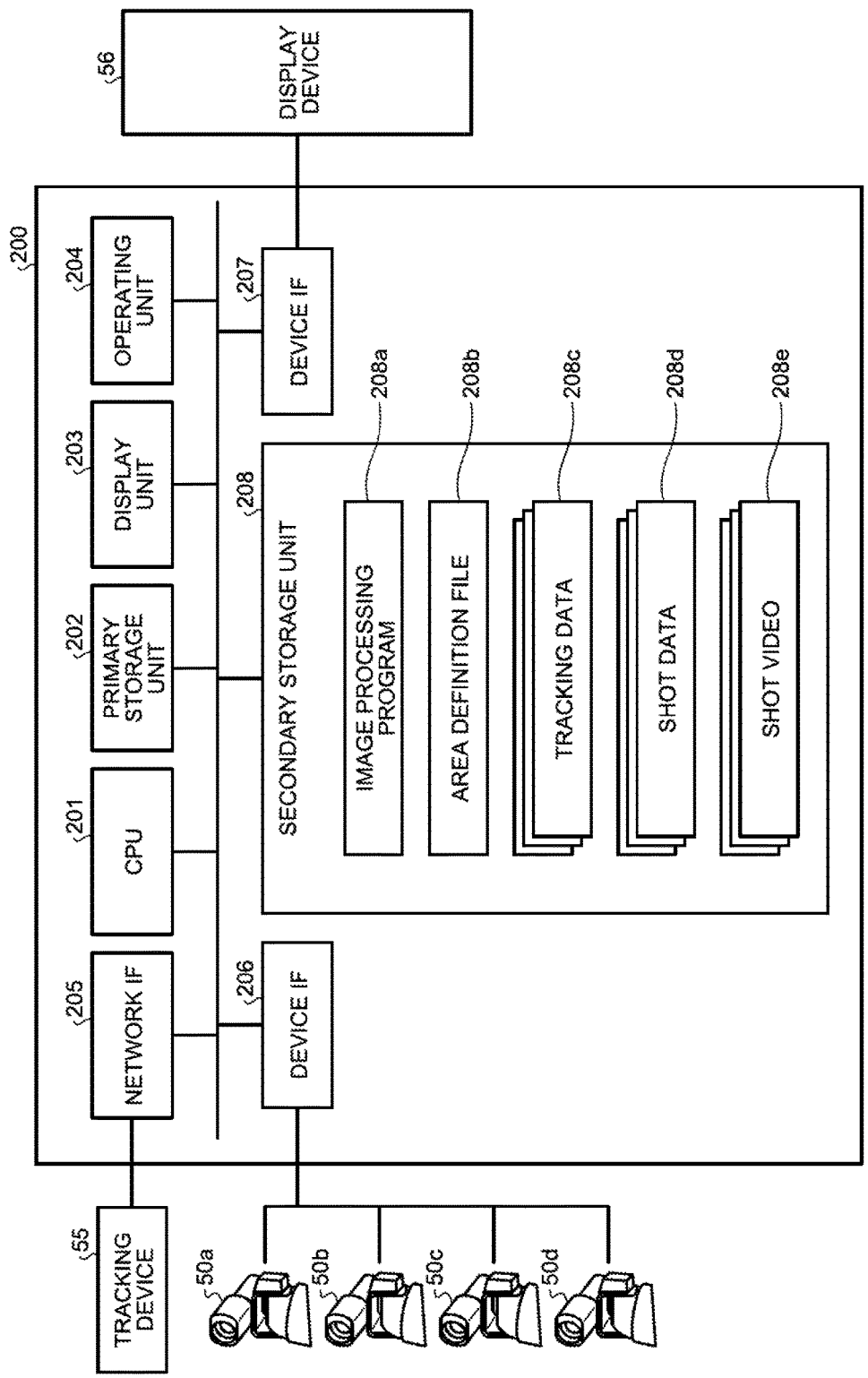
FIG. 19 is a diagram that illustrates an example of the computer that executes an image processing program.
Figure 20:
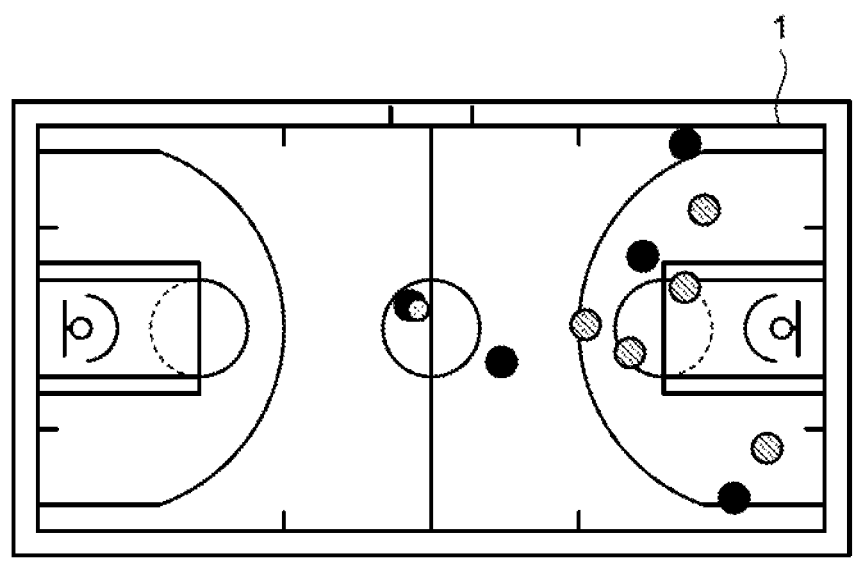
FIG. 20 is a diagram that illustrates an example of the tracking result according to a conventional technology.

Next, an explanation is given of an example of a computer that executes an image processing program that performs the same functionality as that of the image processing device 100 that is explained in the above-described embodiment. FIG. 19 is a diagram that illustrates an example of the computer that executes the image processing program.

As illustrated in FIG. 19, a computer 200 is connected to the cameras 50a, 50b, 50c, and 50d, the tracking device 55, and a display device 56. The computer 200 includes a CPU 201 that executes various types of arithmetic processing; a primary storage unit 202 that temporarily stores various types of information; a display unit 203, such as a display; and an operating unit 204, such as an input device. The computer 200 includes a network IF 205 that communicates data with the tracking device 55. The computer 200 includes a device IF 206 that communicates data with the cameras 50a to 50d. The computer 200 includes a device IF 207 that communicates data with the display device 56. Furthermore, the computer 200 includes a secondary storage unit 208 that is equivalent to a hard disk drive, or the like.

The secondary storage unit 208 includes an image processing program 208a, an area definition file 208b, tracking data 208c, shot data 208d, and shot video 208e. The image processing program 208a is read and executed by the CPU 201 so that it performs the process that corresponds to the determining unit 160, the identifying unit 170, and the clipping unit 180 in FIG. 2. The area definition file 208b is the information that defines a partial region. The tracking data 208c is the information that is acquired from the tracking device 55. The shot data 208d and the shot video 208e are the information that is generated when the image processing program 208a is executed. For example, it is the information that corresponds to the shot data table 130a and the shot-scene video data 130b.

Furthermore, the image processing program 208a and the area definition file 208b do not always need to be initially stored in the secondary storage unit 208. For example, each program is stored in a "portable physical medium", such as a flexible disk (FD), CD-ROM, DVD disk, magnet-optical disk, or IC card, which is inserted into the computer 200. Moreover, the computer 200 may read and execute the image processing program 208a and the area definition file 208b.

It is possible to search for images desired by users in an effective manner.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:
1. An image processing method comprising:
acquiring multiple sets of continuous image data, captured by a capturing device, using a processor;
determining whether an object having a predetermined characteristic is present in a partial region of image data included in the sets of image data, using the processor;
repeatedly detecting the object from image data that is captured prior to the image data where the object is present, when the object is determined to be present in the partial region, using the processor;
calculating a movement trajectory of the object in accordance with positions of the object, detected from multiple sets of image data, and times of the sets of image data, using the processor;
identifying a start position and a start time of the movement trajectory, using the processor; and
identifying a person related to the object by comparing the start position with positions of multiple persons included in image data, captured by the capturing device at a same time as the start time, using the processor.

2. The image processing method according to claim 1, further comprising clipping image data captured by the capturing device between the start time of the movement trajectory and a finish time that elapsed with a predetermined time, using the processor.

3. The image processing method according to claim 1, wherein the predetermined characteristic indicates a shape and a size of the object, and the partial region is set around a position of a goal that is present in image data and that is used for a sport.

4. The image processing method according to claim 1, wherein the detecting detects the object from a region other than the partial region with a low detection accuracy, as compared to an accuracy when detecting the object from the partial region.

5. The image processing method according to claim 1, wherein the calculating changes the movement trajectory in accordance with a type of sport.

6. A non-transitory computer-readable recording medium having stored therein a program that causes a computer to execute a process comprising:
    acquiring multiple sets of continuous image data, captured by a capturing device;
    determining whether an object having a predetermined characteristic is present in a partial region of image data included in the sets of image data;
    repeatedly detecting the object from image data that is captured prior to the image data where the object is present, when the object is determined to be present in the partial region;
    calculating a movement trajectory of the object in accordance with positions of the object, detected from multiple sets of image data, and times of the sets of image data;
    identifying a start position and a start time of the movement trajectory; and
    identifying a person related to the object by comparing the start position with positions of multiple persons included in image data, captured by the capturing device at a same time as the start time.

7. The non-transitory computer-readable recording medium according to claim 6, the process further comprising clipping image data captured by the capturing device between the start time of the movement trajectory and a finish time that elapsed with a predetermined time.

8. The non-transitory computer-readable recording medium according to claim 6, wherein the predetermined characteristic indicates a shape and a size of the object, and the partial region is set around a position of a goal that is present in image data and that is used for a sport.

9. The non-transitory computer-readable recording medium according to claim 6, wherein the detecting detects the object from a region other than the partial region with a low detection accuracy, as compared to an accuracy when detecting the object from the partial region.

10. The non-transitory computer-readable recording medium according to claim 6, wherein the calculating changes the movement trajectory in accordance with a type of sport.

11. An image processing device comprising:
    a processor configured to execute a process comprising:
    acquiring multiple sets of continuous image data, captured by a capturing device;
    determining whether an object having a predetermined characteristic is present in a partial region of image data included in the sets of image data;
    repeatedly detecting the object from image data that is captured prior to the image data where the object is present, when the object is determined to be present in the partial region;
    calculating a movement trajectory of the object in accordance with positions of the object, detected from multiple sets of image data, and times of the sets of image data;
    identifying a start position and a start time of the movement trajectory; and
    identifying a person related to the object by comparing the start position with positions of multiple persons included in image data, captured by the capturing device at a same time as the start time.

12. The image processing device according to claim 11, the process further comprising clipping image data captured by the capturing device between the start time of the movement trajectory and a finish time that elapsed with a predetermined time.

13. The image processing device according to claim 11, wherein the predetermined characteristic indicates a shape and a size of the object, and the partial region is set around a position of a goal that is present in image data and that is used for a sport.

14. The image processing device according to claim 11, wherein the detecting detects the object from a region other than the partial region with a low detection accuracy, as compared to an accuracy when detecting the object from the partial region.

15. The image processing device according to claim 11, wherein the calculating changes the movement trajectory in accordance with a type of sport.

* * * * *